(12) United States Patent
Nomura et al.

(10) Patent No.: US 7,568,773 B2
(45) Date of Patent: Aug. 4, 2009

(54) BRAKE FLUID PRESSURE CONTROLLER FOR VEHICLE

(75) Inventors: Nobuyuki Nomura, Nagano (JP); Tomonori Hirose, Nagano (JP); Takeshi Kojima, Saitama (JP)

(73) Assignees: Nissin Kogyo Co., Ltd., Ueda-shi (JP); Honda Motor Co., Ltd., Tokyo (JP)

( * ) Notice: Subject to any disclaimer, the term of this patent is extended or adjusted under 35 U.S.C. 154(b) by 393 days.

(21) Appl. No.: 11/488,045

(22) Filed: Jul. 18, 2006

(65) Prior Publication Data
US 2007/0018497 A1 Jan. 25, 2007

(30) Foreign Application Priority Data
Jul. 19, 2005 (JP) .............................. 2005-208919
Jul. 28, 2005 (JP) .............................. 2005-219042

(51) Int. Cl.
*B60T 8/42* (2006.01)
(52) U.S. Cl. ..................... 303/115.5; 302/142; 302/146; 302/162
(58) Field of Classification Search .............. 303/115.5, 303/142, 146, 162, 10, 11, 161, 116.1, 116.3, 303/116.4, 115.4
See application file for complete search history.

(56) References Cited

U.S. PATENT DOCUMENTS

| | | | |
|---|---|---|---|
| 5,454,632 A | 10/1995 | Burgdorf et al. | |
| 6,422,662 B1 | 7/2002 | Haas | ........................ 303/155 |
| 7,165,818 B2 | 1/2007 | Iwasaki et al. | ........... 303/115.5 |
| 2005/0040704 A1* | 2/2005 | Iwasaki et al. | .............. 303/157 |

FOREIGN PATENT DOCUMENTS

| | | |
|---|---|---|
| JP | 6-505939 | 7/1994 |
| JP | 2000-203401 | 7/2000 |
| JP | 2001-39286 | 2/2001 |
| WO | WO 00 66406 | 11/2000 |

* cited by examiner

*Primary Examiner*—Melanie Torres
(74) *Attorney, Agent, or Firm*—Kratz, Quintos & Hanson, LLP

(57) ABSTRACT

A brake fluid pressure controller for a vehicle includes: wheel brakes; a master cylinder for supplying pressure to a brake fluid; at least one fluid pressure passage connecting the wheel brakes with the master cylinder; a pump provided on each fluid pressure passage for intensifying the brake fluid pressure; a revolution-controllable motor for driving the pump; a motor drive control part for controlling motor revolutions; a target fluid pressure calculation part for setting a target fluid pressure of the brake fluid; a brake fluid pressure acquisition part; and a fluid pressure deviation calculation part for calculating a difference between the target fluid pressure and the brake fluid pressure. When the difference is less than a predetermined value, the motor drive control part drives the motor at a smaller number of revolutions, as compared with a case where the difference is the predetermined value or more.

14 Claims, 11 Drawing Sheets

FIG.4
(a)
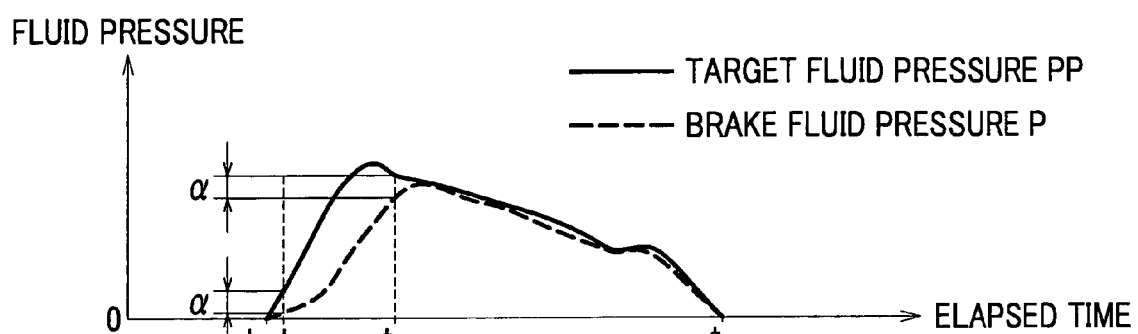
(b)
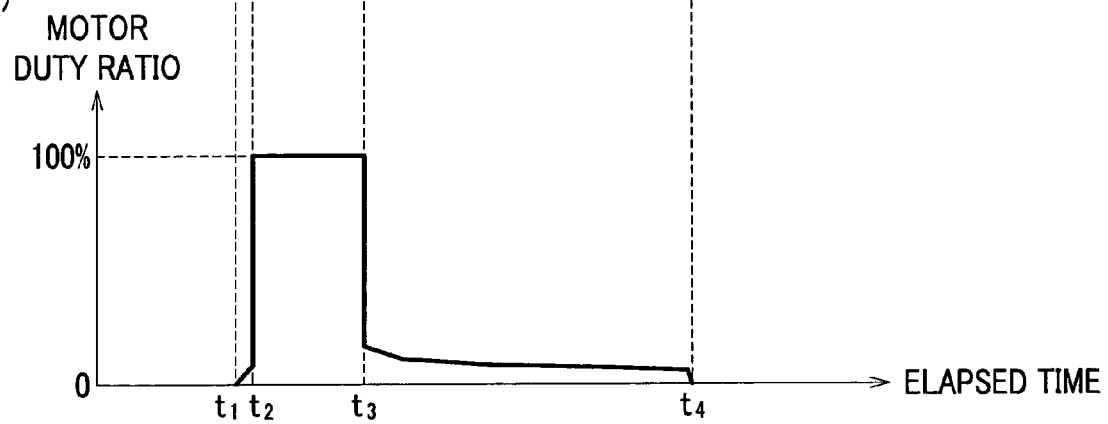

FIG.5
(a)
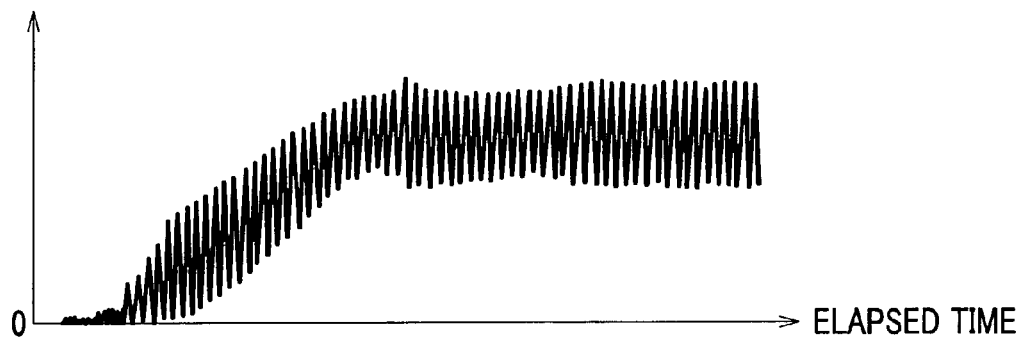
(b)
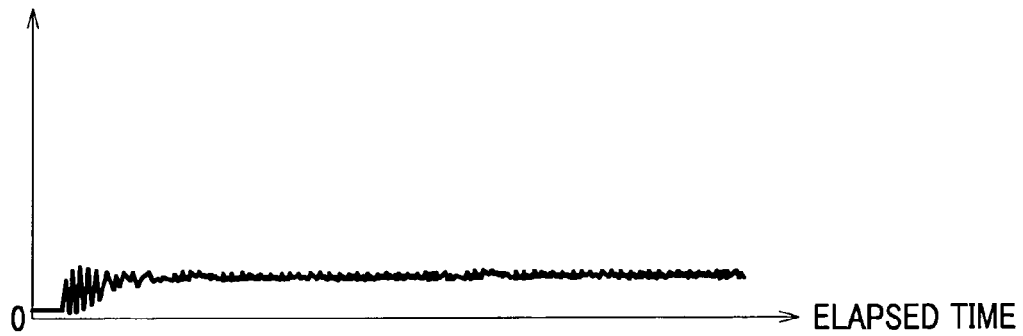

BRAKE FLUID PRESSURE CONTROLLER FOR VEHICLE

CROSS-REFERENCE TO RELATED APPLICATIONS

This application claims the foreign priority benefit under Title 35, United States Code, section 119 (a)-(d), of Japanese Patent Applications No. 2005-208919, filed on Jul. 19, 2005, and No. 2005-219042, filed on Jul. 28, 2005 in the Japan Patent Office, the disclosure of which is herein incorporated by reference in its entirety.

BACKGROUND OF THE INVENTION

1. Field of the Invention

The present invention relates to a brake fluid pressure controller for a vehicle, and particularly, to a brake fluid pressure controller for controlling driving of a pump configured to intensify brake fluid pressure supplied by a master cylinder.

2. Description of the Related Art

There has been known a brake fluid pressure controller for a vehicle which performs anti-lock breaking control, traction control, electronic brake force distribution and the like. Such a brake fluid pressure controller can supply brake fluid pressure (auxiliary pressure) to wheel cylinders not by operation of a brake pedal, but by a pump driven by a motor. Recently, reduction of operation noise of the pump has been demanded from the viewpoint of comfortable driving environment [for example, see Japanese unexamined patent publication Kokai 2000-203401 (paragraph 0038) (hereinbelow referred to as "Patent Document 1"), Japanese Unexamined Patent Publication Kohyo H6-505939 (claim 1 and page 3, right upper column, lines 2-3) (hereinbelow referred to as "Patent Document 2") and Japanese unexamined patent publication Kokai 2001-39286 (claim 1, paragraph 0050, FIG. 6) (hereinbelow referred to as "Patent Document 3")].

Patent Document 1 discloses a device which suppresses operation noise of a motor by driving the motor at high revolutions (duty ratio of 100%) for a predetermined period of time and driving the motor at low revolutions (low duty ratio) after the predetermined period of time.

In Patent Document 2, an attempt is made to reduce noise by operating a motor for driving a pump at 40-60% of a nominal speed, during traction control. In Patent Document 3, an attempt is made to reduce noise by delaying an initiation of pump operation when the vehicle is under certain conditions, specifically under conditions where brake force distribution is electronically conducted and the vehicle is neither in a high-speed driving state nor in a turning state, on non-low μ road.

To sum up, in these prior arts, attempts are made to reduce noise by driving the pump at low speed or delaying the initiation of pump operation, while retaining performance of various necessary functions at a sufficient level.

However, in a case of the device of Patent Document 1, the operation noise of the motor is not satisfactorily suppressed, and further suppression of the operation noise is demanded. In addition, in a case where a part of the brake fluid with pressure intensified by the pump is returned to the master cylinder, operation noise of a cut valve is frequently generated by a pulsation of the brake fluid returning to the cut valve.

By the way, there has also been known a vehicle stability control which controls an overall behavior of a vehicle including, in addition to anti-lock breaking control and traction control, sideslip suppression control where vehicle behavior is stabilized by controlling sideslip or spin when the vehicle is turning. Conventionally in vehicle stability control, when a difference between a target fluid pressure and an estimated fluid pressure becomes a predetermined value or more, it is judged that rapid elevation of pressure is required, and the motor is driven under higher power. However with this judgment method, the above-mentioned condition frequently occurs, i.e., the difference between the target fluid pressure and the estimated fluid pressure frequently becomes the predetermined value or more, and thus the motor is frequently driven at higher revolutions. As a result, noise due to operation had not been fully reduced.

Therefore, it is desired that the operation noise of the motor, the pump, the cut valve and the like be sufficiently reduced during brake fluid pressure control by the pump in behavior stabilization of the vehicle, while maintaining a pressure-intensifying performance of the motor. Especially in the case where overall behavior stabilization of the vehicle is controlled, it is desired that operation noise of the motor, the pump, the cut valve and the like be sufficiently reduced by setting and controlling the operation conditions of the pump based on a state of turning movement, since a fluid pressure required for stabilization varies depending on the state of turning movement.

SUMMARY OF THE INVENTION

In an aspect of the present invention, there is provided a brake fluid pressure controller for a vehicle for controlling brake fluid pressures of a plurality of wheel brakes to respective target fluid pressures comprising: the plurality of wheel brakes; a fluid pressure-supply part configured to supply pressure to a brake fluid; at least one fluid pressure passage connecting the plurality of wheel brakes with the fluid pressure-supply part; a pump which is provided on each fluid pressure passage and capable of intensifying the brake fluid pressure; a revolution-controllable motor configured to drive the pump; a motor drive control part configured to control a revolution number of the motor; which further comprises: a target fluid pressure calculation part configured to set a target fluid pressure of the brake fluid for each of the wheels; a brake fluid pressure acquisition part configured to acquire a brake fluid pressure for each of the wheels; and a fluid pressure deviation calculation part configured to calculate a difference between the target fluid pressure set by the target fluid pressure calculation part and the brake fluid pressure acquired by the brake fluid pressure acquisition part; the motor drive control part driving the motor at a smaller number of revolutions in a case where a difference at the wheel brake between the target fluid pressure and the brake fluid pressure is less than a predetermined value, as compared with a case where the difference between the target fluid pressure and the brake fluid pressure is the predetermined value or more.

In another aspect of the present invention, there is provided a brake fluid pressure controller for a vehicle configured to control a supply of a brake fluid pressure to fluid pressure type brake of each wheel so as to stabilize a behavior of the vehicle, which comprises: a plurality of wheel brakes; a fluid pressure-supply part configured to supply pressure to a brake fluid; at least one fluid pressure passage connecting the plurality of wheel brakes with the fluid pressure-supply part; a pump which is provided on each fluid pressure passage and capable of intensifying the brake fluid pressure; a revolution-controllable motor configured to drive the pump; a behavior judgment part configured to judge whether behavior of the turning vehicle corresponds to an unstable state; a motor drive control part configured to control a drive of the motor when the behavior judgment part judged that the behavior corresponds to the unstable state; further comprising: a turning state judgment part configured to judge a state of turning movement of the vehicle, wherein the motor drive control part controls a drive of the pump under different powers based on a result of the judgment by the turning state judgment part.

BRIEF DESCRIPTION OF THE DRAWINGS

The various aspects, other advantages and further features of the present invention will become more apparent by describing in detail illustrative, non-limiting embodiments thereof with reference to the accompanying drawings.

FIG. 4 shows a comparison between a fluid pressure and a duty ratio of a motor relative to elapsed time. (a) is a graph showing time change of a target fluid pressure and a brake fluid pressure of a wheel brake, and (b) is a graph showing time change of a duty ratio of a motor.

FIG. 5 shows a comparison between two exemplified graphs of pulsation returning to a cut valve. (a) is a graph in a case of a motor driven at a duty ratio of 100%, and (b) is a graph in a case of a motor driven at a low duty ratio.

DETAILED DESCRIPTION OF THE EXEMPLARY EMBODIMENTS

Embodiments of the present invention will be described in detail below with reference to the drawings.

Figure 1:
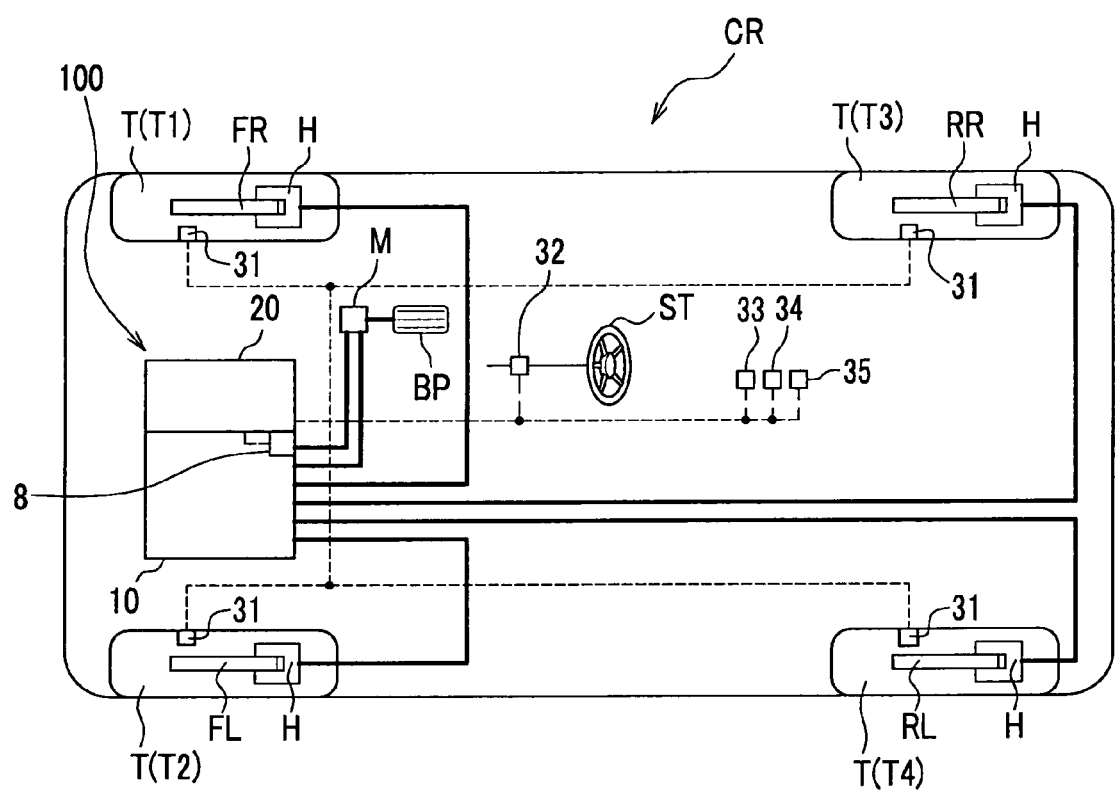
FIG. 1 is a configuration diagram of a vehicle having a brake fluid pressure controller according to one embodiment of the present invention.
Figure 2:
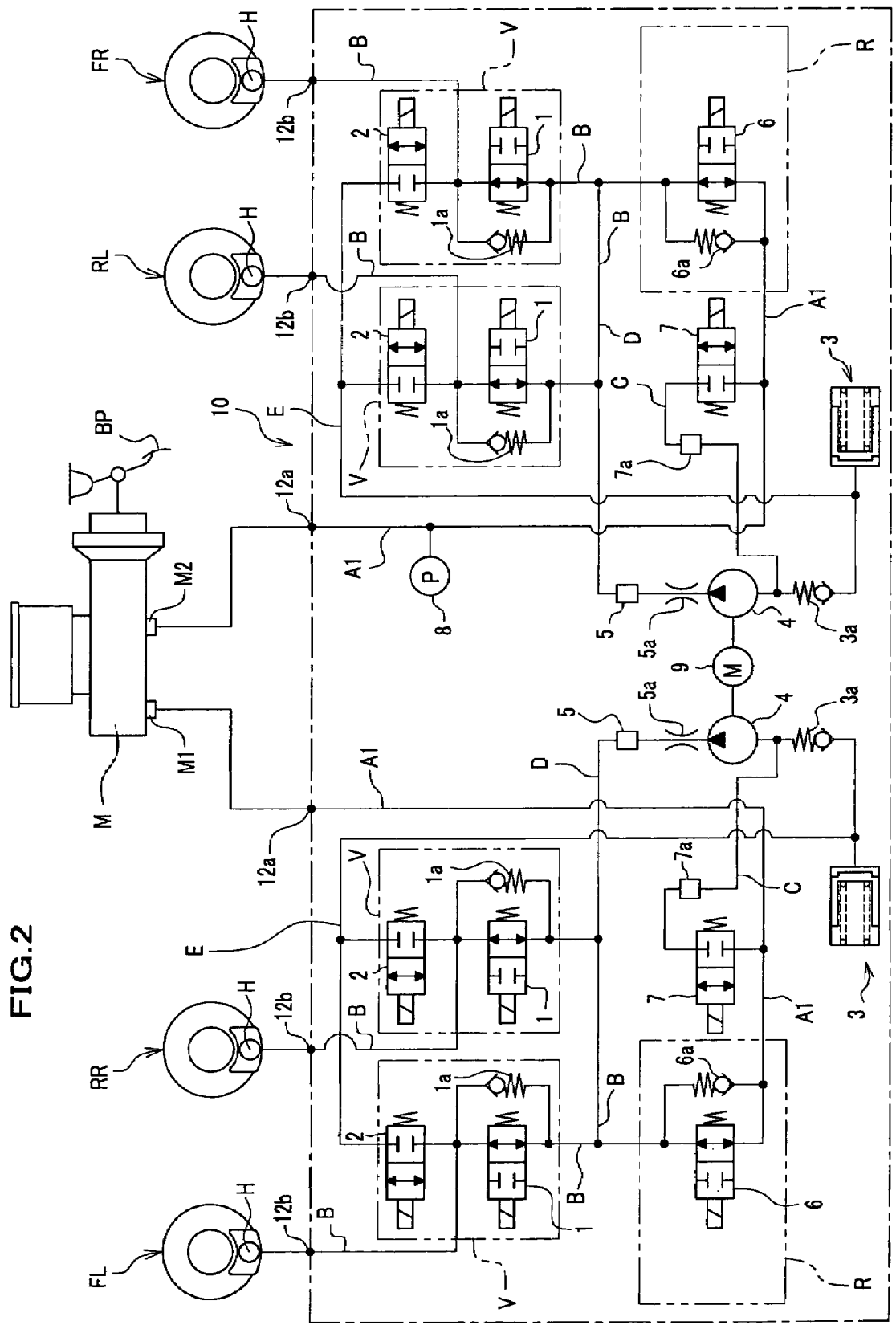
FIG. 2 is a brake fluid pressure circuit diagram of a brake fluid pressure controller for a vehicle.

FIG. 1 is a configuration diagram of a vehicle having a brake fluid pressure controller according to one embodiment of the present invention. FIG. 2 is a brake fluid pressure circuit diagram of a brake fluid pressure controller for a vehicle.

As shown in FIG. 1, the vehicle body CR is provided with: a brake fluid pressure controller 100 for a vehicle according to the present embodiment; wheel speed sensors 31 connected to the brake fluid pressure controller 100, each configured to detect a wheel speed of respective wheels T; a wheel angle sensor 32 configured to detect a wheel angle of a steering ST; a lateral acceleration sensor 33 configured to detect a centrifugal force in a lateral direction (acceleration) acting on the vehicle body CR; a yaw rate sensor 34 configured to detect a yaw rate (rotational angular speed) during turning of the vehicle body CR; an acceleration sensor 35 configured to detect an acceleration in a front-rear direction of the vehicle body CR; and a master pressure sensor 8 configured to detect a brake fluid pressure (hereinbelow simply referred to as "master cylinder pressure") generated by a master cylinder M (see FIG. 2). It should be noted that the yaw rate sensor 34 is one example of an "actual turning amount detection part", and the master cylinder M is one example of a "fluid pressure-supply part". Results of detection by the sensors 31-35 are output to the controller 20. The wheel speed sensor 31 is provided on each of the wheels T (T1, T2, T3 and T4), and with this configuration, wheel speeds of all of the four wheels T can be acquired in the brake fluid pressure controller 100.

The controller 20 is equipped with, for example, a CPU, a RAM, a ROM and an input-output circuit, and performs control by various computations based on inputs from the wheel speed sensors 31, the wheel angle sensor 32, the lateral acceleration sensor 33, the yaw rate sensor 34, the acceleration sensor 35, and the master pressure sensor 8, as well as on programs or data recorded in the ROM.

The brake fluid pressure controller 100 is configured to appropriately control braking force (brake fluid pressure) applied to each of the wheels T of the vehicle body CR, and as shown in FIG. 1, mainly comprises: a fluid pressure unit 10 having fluid passages and various parts; and a controller 20 configured to appropriately control various parts in the fluid pressure unit 10.

The wheel cylinder H is a fluid pressure device configured to convert a brake fluid pressure generated by the master cylinder M and the brake fluid pressure controller 100 into actuating forces for wheel brakes FR, FL, RR, RL provided on the respective wheels T. Each wheel cylinder H is connected to the fluid pressure unit 10 of the brake fluid pressure controller 100 through pipings.

Referring to a brake fluid pressure circuit diagram of FIG. 2, functions of various parts provided in the fluid pressure unit 10 will be briefly explained below. In FIG. 2, solid lines connecting the various parts in the fluid pressure unit 10 represents fluid passages (oil passages) formed in the fluid pressure unit 10.

As shown in FIG. 2, the fluid pressure unit 10 of the brake fluid pressure controller 100 is disposed between the master cylinder M, which is a fluid pressure-supply part configured to generate brake fluid pressure according to a tread force applied to a brake pedal BP by a driver, and the wheel brakes FL, FR, RL, RR. Two output ports M1 and M2 of the master cylinder M are connected to respective inlet ports 12*a* of the fluid pressure unit 10, and outlet ports 12*b* of the fluid pressure unit 10 are connected to the wheel brakes FL, FR, RL, RR. Under normal conditions, fluid passage is formed from the inlet port 12*a* to the outlet port 12*b* in the fluid pressure unit 10, and therefore a tread force on the brake pedal BP is transmitted to each of the wheel brakes FL, FR, RL, RR.

The fluid passage that begins at the output port M1 of the master cylinder M leads to the wheel brake FL on a front left wheel side as well as the wheel brake RR on a rear right wheel side; while the fluid passage that beings at the output port M2 leads to the wheel brake FR on a front right wheel side as well as the wheel brake RL on a real left wheel side. Hereinbelow, the fluid passage that begins at the output port M1 is referred to as a "first system," and the fluid passage that begins at the output port M2 is referred to as a "second system".

In the first system of the fluid pressure unit 10, two control valve means V,V are provided each of which corresponds to the respective wheel brakes FL, RR, and likewise, in the second system, two control valve means V,V are provided each of which corresponds to the respective wheel brakes RL, FR. In each of the first and second systems of the fluid pressure unit 10, a reservoir 3, a pump 4, a damper 5, an orifice 5a, a regulator R, a suction valve 7 and a pool chamber 7a are provided, and a motor (DC motor) 9 is further provided for driving the pumps 4,4 of both the first and second systems. The motor 9 is a revolution-controllable motor, and in a first embodiment which will be described below, the number of revolutions is controlled by duty control. Further, in the embodiments, only the second system is provided with the master pressure sensor 8 for detecting a master cylinder pressure.

Hereinbelow, the fluid passage leading from the output ports M1, M2 of the master cylinder M to each of the regulators R is referred to as an "output fluid pressure passage A1", and each of the fluid passage leading from the regulator R of the first system to the wheel brakes FL, RR and the fluid passage leading from the regulator R of the second system to the wheel brakes RL, FR is referred to as a "wheel fluid pressure passage B". The fluid passage from the output fluid pressure passage A1 to the pump 4 is referred to as a "sucked fluid pressure passage C", and the fluid passage from the pump 4 to the wheel fluid pressure passage B is referred to as a "discharged fluid pressure passage D". Further, the fluid passage from the wheel fluid pressure passage B to the sucked fluid pressure passage C is referred to as an "open passage E".

The control valve means V has an inlet valve 1, an outlet valve 2 and a check valve 1a, and is configured to switch one pressure state to another, the states including: an intensified-pressure state in which the wheel fluid pressure passage B is left open and the open passage E is left closed; a reduced-pressure state in which the wheel fluid pressure passage B is left closed and the open passage E is left open; and a retained-pressure state in which the wheel fluid pressure passage B and the open passage E are left closed.

The inlet valve 1 is an electromagnetic valve which is disposed on the wheel fluid pressure passage B and normally left open. Under normal conditions, the inlet valve 1 is left open and allows brake fluid pressure to be transmitted from the master cylinder M to each of the wheel brakes FL, FR, RL, RR. In addition, when the wheel T is about to be locked, the inlet valve 1 is closed by the controller 20 shown in FIG. 1, which blocks transmission of the brake fluid pressure caused by the brake pedal BP to each of the wheel brakes FL, FR, RL, RR.

The outlet valve 2 is an electromagnetic valve which is disposed between the wheel fluid pressure passage B and the open passage E and normally left closed. Under normal conditions, the outlet valve 2 is left closed. When the wheel T is about to be locked, the outlet valve 2 is opened by the controller 20 shown in FIG. 1 and the brake fluid pressures acting on each of the wheel brakes FL, FR, RL, RR are released to the respective reservoirs 3.

The check valve 1a is connected in parallel with the corresponding inlet valve 1. The check valve 1a allows a flow of the brake fluid only from wheel brake FL, FR, RL, RR-sides to a master cylinder M-side, and even when the brake pedal BP is freed while the inlet valve 1 is left closed, the brake fluid is allowed to flow from the wheel brakes FL, FR, RL, RR-sides to the master cylinder M-side.

The reservoir 3 is disposed on the open passage E, and has a function of absorbing brake fluid pressure released from each opened outlet valve 2. Between the reservoir 3 and the pump 4, a check valve 3a is disposed that allows the brake fluid to flow only from a reservoir 3-side to a pump 4-side.

The pump 4 is disposed between the sucked fluid pressure passage C which is connected to the output fluid pressure passage A1 and the discharged fluid pressure passage D which leads to the wheel fluid pressure passage B, and has a function of sucking the brake fluid pooled in the reservoir 3 and discharging the sucked brake fluid into the discharged fluid pressure passage D. With this configuration, a pressure of the output fluid pressure passage A1 and the wheel fluid pressure passage B recover which have been reduced by absorption of the brake fluid pressure by the reservoir 3. Further, when a cut valve 6, which will be described below, blocks a flow of the brake fluid from the output fluid pressure passage A1 to the wheel fluid pressure passage B and at the same time the suction valve 7, which will be described below, opens the sucked fluid pressure passage C, the pump 4 sucks the brake fluid pooled in the master cylinder M, the output fluid pressure passage A1, the sucked fluid pressure passage C and the pool chamber 7a and discharges the sucked fluid to the discharged fluid pressure passage D. With this configuration, when the pedal is not operated, brake fluid pressure can be applied to each of the wheel brakes FL, FR, RL, RR. In other words, the pump 4 can intensify the brake fluid pressure in the output fluid pressure passage A1 on wheel brake FL, RR (RL, FR) sides relative to the cut valve 6. It should be noted that a volume of the discharged brake fluid from the pump 4 depends on the number of revolutions (or duty ratio) of the motor 9. In other words, the larger the number of revolutions (or duty ratio) of the motor 9 becomes, the larger the volume of the discharged brake fluid from the pump 4.

The damper 5 and the orifice 5a cooperatively reduce pressure pulsation of the brake fluid discharged from the pump 4 and pulsation caused by operation of the regulator R, which will be described below.

The regulator R comprises the cut valve 6 and a check valve 6a and has a function of: switching between a state that allows a flow of the brake fluid from the output fluid pressure passage A1 to the wheel fluid pressure passage B and a state that blocks the flow; and adjusting the brake fluid pressure of the wheel fluid pressure passage B and the discharged fluid pressure passage D to a set value or less when the flow of the brake fluid from the output fluid pressure passage A1 to the wheel fluid pressure passage B is blocked.

The cut valve 6 is disposed between the output fluid pressure passage A1 connected to the master cylinder M and the wheel fluid pressure passage B leading to the wheel brakes FL, FR, RL, RR and normally left open. The cut valve 6 switches between a state that allows a flow of the brake fluid from the output fluid pressure passage A1 into the wheel fluid pressure passage B and a state that blocks the flow. The cut valve 6 may be, for example, a solenoid valve or a linear solenoid valve, which is capable of adjusting valve-opening pressure by controlling energization of the solenoid. The cut valve 6 is left open under normal conditions and allows the brake fluid pressure to be transmitted from the master cylinder M to each of the wheel brakes FL, FR, RL, RR. In addition, when the pump 4 operates while the pedal is free, i.e. when the brake fluid pressure is applied to each of the wheel brakes FL, FR, RL, RR while the pedal is free, the cut valve 6 is closed by operation of the controller 20, and by utilizing a balance between the fluid pressure from the wheel fluid pressure passage B act on the regulator R and a force to close the valve controlled by energization of the solenoid, the fluid pressure of the wheel fluid pressure passage B can be adjusted while releasing the pressure to the output fluid pressure passage A1.

The check valve 6a is connected in parallel with the corresponding cut valve 6. The check valve 6a is an one-way valve that allows a flow of the brake fluid only from the output fluid pressure passage A1 to the wheel fluid pressure passage B, and even when there is an input from the brake pedal BP with each cut valve 6 closed, the brake fluid is allowed to flow from the output fluid pressure passage A1 to the wheel fluid pressure passage B.

The suction valve 7 is an electromagnetic valve which is disposed on the sucked fluid pressure passage C and normally left closed. The suction valve 7 switches between states in which the sucked fluid pressure passage C is opened and closed. While the pedal is not operated and the cut valve 6 is kept blocking the flow of the brake fluid from the output fluid pressure passage A1 to the wheel fluid pressure passage B, in other words, when the brake fluid pressure is applied to each of the wheel brakes FL, FR, RL, RR with the pedal left unoperated, the suction valve 7 is opened by operation of the controller 20.

The pool chamber 7a is disposed between the pump 4 and the suction valve 7 on the sucked fluid pressure passage C. The pool chamber 7a is configured to pool brake fluid, and the presence of the pool chamber 7a substantially increases a volume of the brake fluid pooled in the sucked fluid pressure passage C.

The master pressure sensor 8 is configured to detect a brake fluid pressure of the output fluid pressure passage A1, and a result of the detection is continually delivered to the controller 20. The controller 20 judges whether a brake fluid pressure is output from the master cylinder M or not, i.e., whether the brake pedal BP is pressed or not. In addition, based on a magnitude of the brake fluid pressure detected by the master pressure sensor 8, the vehicle body CR is controlled.

First Embodiment

Figure 3:
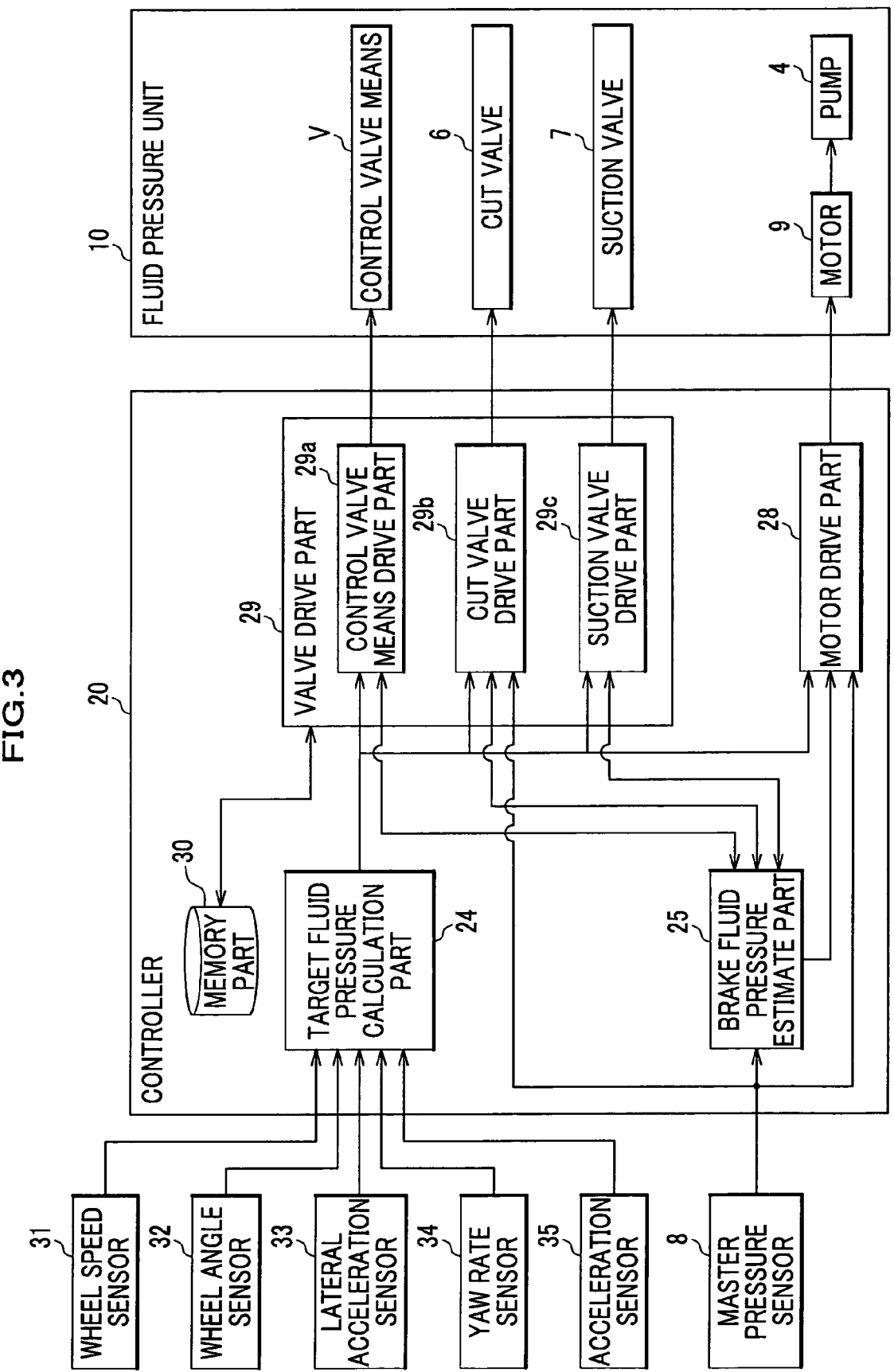
FIG. 3 is a block diagram of a controller according to one embodiment of the present invention.

FIG. 3 is a block diagram of a controller according to one embodiment of the present invention.

As shown in FIG. 3, based on signals input from the sensors 31-35, the controller 20 controls opening/closing of the control valve means V, the cut valve 6 and the suction valve 7 in the fluid pressure unit 10, as well as operation of the motor 9, so as to control the operation of the wheel brakes FL, RR, RL, FR. In the present embodiment, the cut valve 6 is a linear solenoid valve. The controller 20 includes a target fluid pressure calculation part 24, a brake fluid pressure estimate part 25, a motor drive part 28, and a valve drive part 29, as functional parts. It should be noted that, in the present embodiment, the motor drive part 28 includes both "fluid pressure deviation calculation part" and "motor drive control part".

The target fluid pressure calculation part 24 selects a control logic based on signals input from the sensors 31-35, and based on the selected control logic, sets target fluid pressures $PP_{FL}$, $PP_{RR}$, $PP_{RL}$, $PP_{FR}$ for the respective wheel brakes FL, RR, RL, FR. There is no limitation with respect to the method for setting, and conventional methods can be used. For example, a vehicle speed is calculated from wheel speeds of the four wheels T. Then, a slip ratio is calculated from the wheel speed and the vehicle speed. Further, based on the lateral acceleration and the acceleration in front-rear direction of the vehicle body CR, a resultant acceleration is computed. From the resultant acceleration, a friction coefficient of the road surface is estimated. Finally, based on the friction coefficient, a slip ratio and brake fluid pressures $P_{FL}$, $P_{RR}$, $P_{RL}$, $P_{FR}$ of the wheel cylinders H at present, the target fluid pressures $PP_{FL}$, $PP_{RR}$, $PP_{RL}$, $PP_{FR}$ for the respective wheel brakes FL, RR, RL, FR can be set.

In addition, for each system, the target fluid pressure calculation part 24 compares target fluid pressures ($PP_{FL}$ to $PP_{RR}$/$PP_{RL}$ to $PP_{FR}$) and set the higher target fluid pressure as a target fluid pressure $PP_{REG}$ of the cut valve 6 in each system. The target fluid pressure $PP_{REG}$ is a target fluid pressure of each output fluid pressure passage A1 on a wheel brake side relative to the cut valve 6 and is adjustable by the cut valve 6.

The set target fluid pressures $PP_{FL}$, $PP_{RR}$, $PP_{RL}$, $PP_{FR}$, $PP_{REG}$ are appropriately output to the valve drive part 29 and the motor drive part 28.

The brake fluid pressure estimate part 25 calculates brake fluid pressures (estimated brake fluid pressures) $PP_{FL}$, $PP_{RR}$, $PP_{RL}$, $PP_{FR}$ of the respective wheel brakes FL, RR, RL, FR, based on the brake fluid pressure detected by the master pressure sensor 8 and drive amounts of the electromagnetic valves 1, 2 and 6 driven by the valve drive part 29.

In other words, a combination of the master pressure sensor 8 and the brake fluid pressure estimate part 25 is one example of a "brake fluid pressure acquisition part".

The calculated brake fluid pressure is output to the valve drive part 29 and the motor drive part 28.

For the brake fluid pressure, it is possible to use an actually measured value (measured brake fluid pressure) instead of the estimate value (estimated brake fluid pressure). The measured brake fluid pressure can be acquired by, for example, pressure sensors each provided on the respective wheel brakes. However, the estimated brake fluid pressure can be acquired by, for example, calculation based on a pressure of a fluid pressure passage detected by a pressure sensor provided on the fluid pressure passage and on driving of the brake fluid pressure controller. The latter is preferable because less pressure sensors are required.

To the fluid pressure unit 10, the valve drive part 29 outputs pulse signals for operating the inlet valve 1, the outlet valve 2, the cut valve 6 and the suction valve 7 in the fluid pressure unit 10 by conventional methods, so that the brake fluid pressure of the wheel cylinder H of each of the wheel brakes FL, RR, RL, FR matches with the respective target fluid pressures set by the target fluid pressure calculation part 24. For example, the pulse signal is set so as to output a larger number of pulses when the differences between the brake fluid pressures $PP_{FL}$, $PP_{RR}$, $PP_{RL}$, $PP_{FR}$ and the respective target fluid pressures $PP_{FL}$, $PP_{RR}$, $PP_{RL}$, $PP_{FR}$ of the wheel cylinder H at present are larger.

The valve drive part 29 determines operation of the control valve means V, the cut valve 6 and the suction valve 7 and drives them, based on the target fluid pressures $PP_{FL}$, $PP_{RR}$, $PP_{RL}$, $PP_{FR}$, $PP_{REG}$, the cut valve fluid pressure $P_{REG}$ and the brake fluid pressures $PP_{FL}$, $PP_{RR}$, $PP_{RL}$, $P_{FR}$, and is equipped with a control valve means drive part 29a configured to drive the control valve means V; a cut valve drive part 29b configured to drive the cut valve 6; and a suction valve drive part 29c configured to drive the suction valve 7.

The motor drive part 28 determines the number of revolutions of the motor 9 and drives the motor 9, based on the target fluid pressures $PP_{FL}$, $PP_{RR}$, $PP_{RL}$, $PP_{FR}$, $PP_{REG}$, the cut valve fluid pressure $P_{REG}$ and the brake fluid pressures $PP_{FL}$, $PP_{RR}$, $PP_{RL}$, $P_{FR}$. In other words, the motor drive part 28 drives the motor 24 by revolution control, and in the present embodiment, the number of revolutions is controlled by duty control.

The drive control by the motor drive part 28 will be described in detail below.

FIG. 4 shows a comparison between a fluid pressure and a duty ratio of a motor relative to elapsed time. (a) is a graph showing time change of a target fluid pressure and a brake fluid pressure of a wheel brake, and (b) is a graph showing time change of a duty ratio of a motor.

As shown in FIG. 4, first, at an elapsed time t1, the brake fluid pressure controller 100 initiated a stability control of the vehicle body CR, and when a difference between the brake fluid pressure P and the target fluid pressure PP is less than a predetermined value $\alpha$ (PP−P <$\alpha$, PP>P, in elapsed time period t1-t2), the motor drive part 28 drives the motor 9 at a smaller number of revolutions than a maximum number of revolutions, or in the present embodiment, drives at lower duty ratio. At the same time, the duty ratio of the motor 9 is adjusted so that the brake fluid pressure P approaches the target fluid pressure PP. It should be noted that the term "predetermined value" herein means an appropriately and empirically determined threshold having a positive sign. The term "maximum number of revolutions" means the maximum value for revolutions when the motor 9 is under control of the present invention. When the difference between the brake fluid pressure P and the target fluid pressure PP is $\alpha$ or more (PP−P$\geq\alpha$, PP>P, in elapsed time period of t2-t3), the motor drive part 28 drives the motor 9 at a maximum number of revolutions, and in the present embodiment, drives at a duty ratio of 100%. When the difference between the brake fluid pressure P and the target fluid pressure PP is less than $\alpha$ (PP−P<$\alpha$, PP>P, in elapsed time period of t3-t4), the motor drive part 28 drives the motor 9 at a smaller number of revolutions than the maximum number of revolutions, and in the present embodiment, drives at a lower duty ratio. At the same time, the duty ratio of the motor 9 is adjusted so that the brake fluid pressure P approaches the target fluid pressure PP. Upon this adjustment, the motor drive part 28 performs the control in such a manner that the brake fluid pressure P does not exceed the target fluid pressure PP, in other words, the brake fluid pressure P approaches the target fluid pressure PP while maintaining the value of the brake fluid pressure P at or below the target fluid pressure PP.

Therefore, the brake fluid pressure controller 100 can suppress operation noise of the motor 9 while maintaining pressure-intensifying performance of the pump 4, as compared with the conventional device in which the motor 9 is driven at duty ratio of 100% for a predetermined period of time and then at a lower duty ratio.

This control can be applied to the wheel brake having the maximum target fluid pressure, among the four wheel brakes FL, RR, RL, FR.

FIG. 5 shows a comparison between two exemplified graphs of pulsation returning to a cut valve. (a) is a graph in a case of a motor driven at a duty ratio of 100%, and (b) is a graph in a case of a motor driven at a low duty ratio. In each graph, a vertical axis indicates brake fluid pressure (cut valve fluid pressure) acting on the cut valve 6, and a horizontal axis indicates elapsed time. Scales for corresponding axes in the graphs are identical.

As is indicated from FIGS. 5(a) and (b), pulsation returning to the cut valve 6 is smaller in a case where the motor 9 is driven at a low duty ratio, as compared with a case where the motor 9 is driven at a duty ratio of 100%. In other words, when the difference between the brake fluid pressure P and the target fluid pressure PP is $\alpha$ or more, the motor 9 is driven at a duty ratio of 100%, and when the difference between the brake fluid pressure P and the target fluid pressure PP is less than $\alpha$, the motor 9 is driven at a lower duty ratio. As a result, pulsation to the cut valve 6 and thus operation noise of the cut valve 6 are suppressed while maintaining the pressure-intensifying performance of the motor 9, and at the same time operation noise of the motor 9 is lowered.

Next, motor operation process by the controller 20 will be explained.

Figure 6:
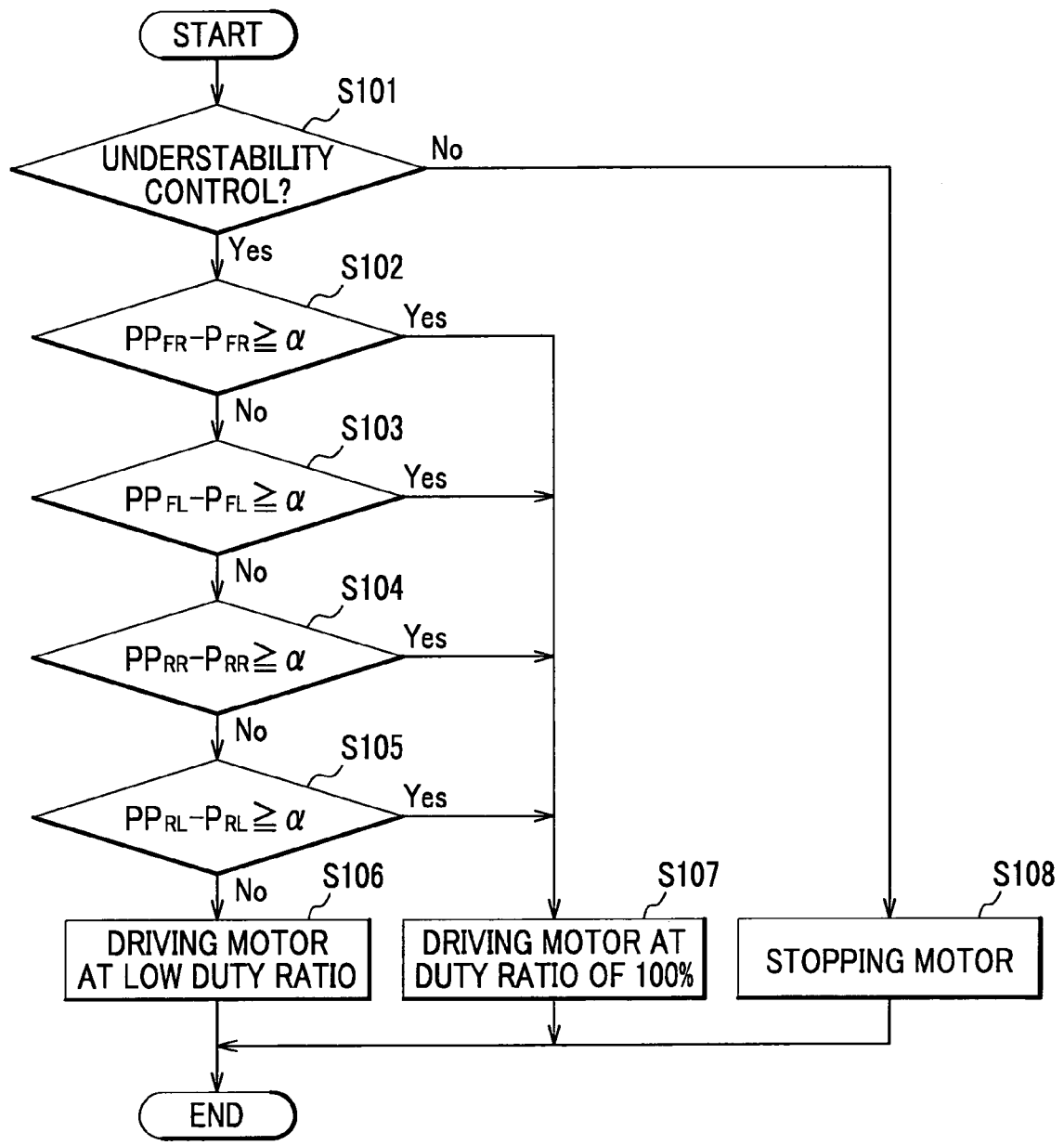
FIG. 6 is a flow chart showing motor operation process by a controller.

FIG. 6 is a flow chart showing motor operation process by a controller.

As shown in FIG. 6, first, the controller 20 judges whether a stability control is performed or not (step S101).

In a case where stability control is performed (Yes in step S101), the difference between the target fluid pressure and the brake fluid pressure (a value obtained by subtracting the brake fluid pressure from the target fluid pressure) is calculated for each of the wheel brakes, and the calculated value is compared with the predetermined value $\alpha$ (steps S102, S103, S104 and S105).

When the differences between the target fluid pressure and the brake fluid pressure for all wheel brakes are less than the predetermined value $\alpha$ (PP−P<$\alpha$ with the proviso that the target fluid pressure PP is larger than the brake fluid pressure P for at least one wheel brake. It should be noted that, when performing the stability control of the present invention, the target fluid pressure PP is larger than the brake fluid pressure P for all of the wheel brakes), i.e., when "No" is selected in all of the steps S102, S103, S104 and S105, the controller 20 drives the motor 9 at a low duty ratio (step S106). Accordingly, the controller 20 drives the motor 9 in such a manner that the brake fluid pressure approaches the target fluid pressure for the wheel brake having the maximum target fluid pressure among the wheel brakes FL, RR, RL, FR.

In addition, when the difference between the target fluid pressure and the brake fluid pressure for any of the wheel brakes FL, RR, RL, FR is a predetermined value $\alpha$ or more (Yes in any of the steps S102, S103, S104 and S105), the controller 20 drives the motor 9 at a duty ratio of 100% (step S107).

When the stability control is not performed (No in the step S101), the controller 20 stops the motor 9 (step S108).

According to the brake fluid pressure controller 100 for a vehicle, the following effects can be obtained.

When the difference between the brake fluid pressure P and the target fluid pressure PP is $\alpha$ or more, the motor 9 is driven at a duty ratio of 100%, and when the difference between the brake fluid pressure P and the target fluid pressure PP is less than $\alpha$, the motor 9 is driven at a lower duty ratio. With this control, a period of time for driving the motor 9 at a maximum duty ratio can be adjusted depending on a necessity of the control. Therefore, operation noise and pulsation can be suppressed while maintaining pressure-intensifying performance of the pump 4.

When the motor 9 is driven at a low duty ratio, the motor 9 is driven in such a manner that the pressure of the wheel brake with the maximum target fluid pressure among the wheel brakes FL, FR, RL, RR approaches the target fluid pressure. Therefore, the brake fluid pressure of one of the wheel brakes is controlled by driving of the motor 9. In addition, drive amount (number of revolutions) of the motor 9 can be suppressed to a requisite minimum, and thus operation noise and pulsation can be further suppressed.

Since a brake fluid pressure for each of the wheel brakes FL, FR, RL, RR is estimated, less pressure sensors are required as compared with the case where the brake fluid pressures are actually measured Since the number of revolutions of the motor 9 is controlled by duty control, the driving of the motor 9 is easily and accurately controlled.

The first embodiment of the present invention has been described above. However, the present invention should not be limited to the above embodiment, and it is a matter of course that the above embodiment may properly be modified without departing from the scope of the present invention. For example, in the step S107, the motor 9 may be operated at a duty ratio of less than 100%, as long as the duty ratio is the maximum in the control. In addition, the revolution control of the motor 9 may be performed by a method other than duty control, for example, by control of applied voltage.

In addition, the control following the flow chart of FIG. 6 may be applied not only to the stability control, but also a traction control and the like.

Second Embodiment

Figure 7:
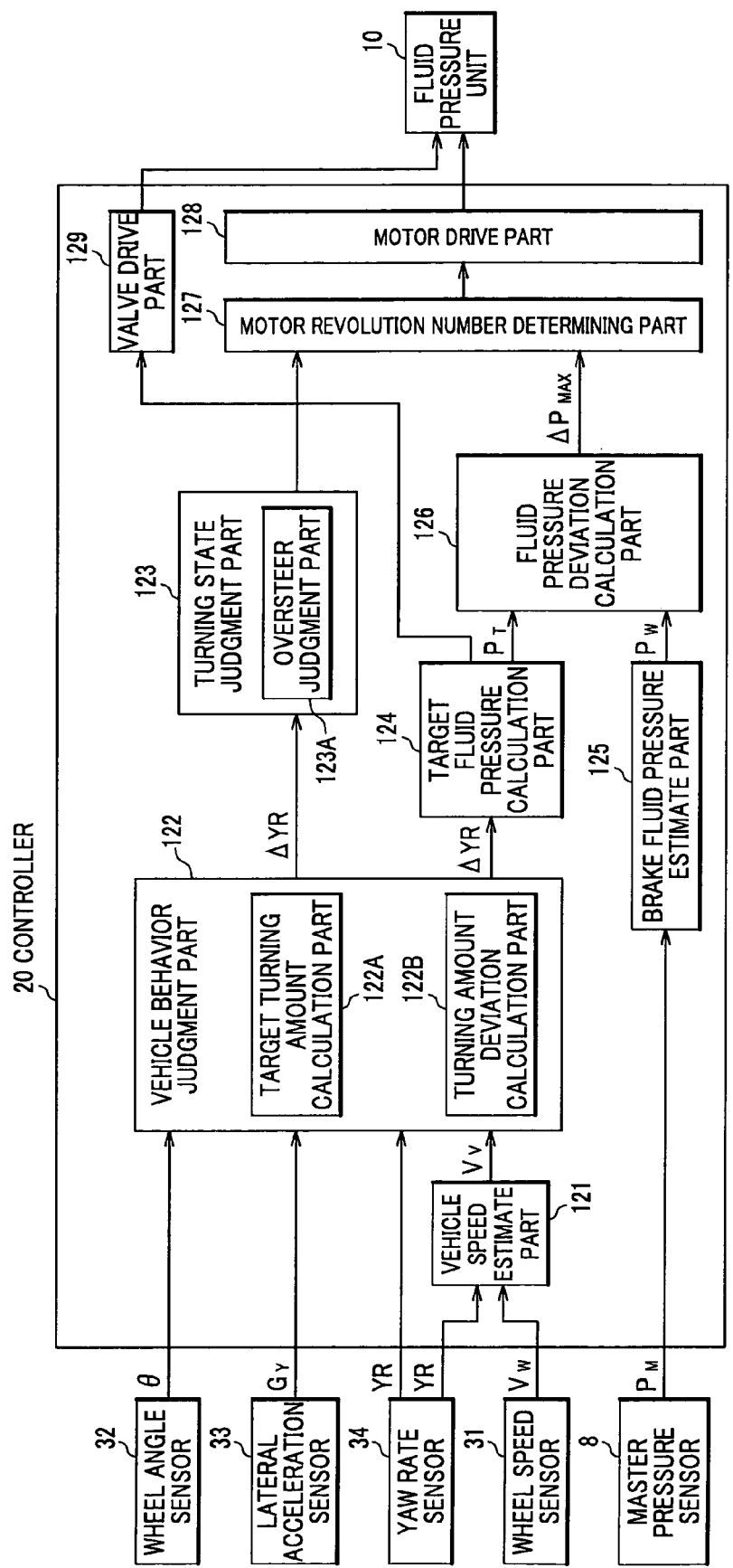
FIG. 7 is a block diagram of a controller according to another embodiment of the present invention.

FIG. 7 is a block diagram of a controller according to a second embodiment.

As shown in FIG. 7, the controller 20 is configured to control drive of the pump 4, the electromagnetic valve and the like in the fluid pressure unit 10, based on detection signals from the sensors 31-35 upon sideslip suppression control when the vehicle body CR is turning. The controller 20 includes a vehicle speed estimate part 121, a vehicle behavior judgment part 122, a turning state judgment part 123, a target fluid pressure calculation part 124, a brake fluid pressure estimate part 125, a fluid pressure deviation calculation part 126, a motor revolution number determining part 127, a motor drive part 128 and a valve drive part 129. It should be noted that, in the present embodiment, a part corresponding to the motor drive part 28 in the first embodiment is indicated by two separate parts, the motor revolution number determining part 127 and the motor drive part 128.

The vehicle speed estimate part 121 calculates a vehicle speed $V_V$ based on the wheel speed $V_W$ detected by the wheel speed sensors 31 (in the drawing, only one sensor is shown) provided on the four wheels T and an actual yaw rate YR detected by the yaw rate sensor 34. Then the vehicle speed estimate part 121 outputs the calculated vehicle speed $V_V$ to the vehicle behavior judgment part 122. The vehicle speed $V_V$ can be calculated by conventional methods, and it may be calculated as an average of four wheel speeds $V_W$, or as an average of speeds of follower wheels.

The vehicle behavior judgment part 122 receives the vehicle speed $V_V$ input from the vehicle speed estimate part 121, a wheel angle θ input from the wheel angle sensor 32, a lateral acceleration $G_y$ input from the lateral acceleration sensor 33, and a detection signal of the actual yaw rate YR from the yaw rate sensor 34, and judges whether the vehicle behavior meets stabilization conditions corresponding to the driving state. The vehicle behavior judgment part 122 has a target turning amount calculation part 122A and a turning amount deviation calculation part 122B. The target turning amount calculation part 122A obtains a value by searching a map (now shown) based on the vehicle speed $V_V$ and the wheel angle θ; subjects the value to limit-processing with the lateral acceleration $G_y$; and calculates a target yaw rate $YR_{NOM}$. The target yaw rate $YR_{NOM}$ herein means a yaw rate that should be obtained in a neutral steering state. The turning amount deviation calculation part 122B calculates a yaw rate deviation ΔYR, which is a difference between the actual yaw rate YR detected by the yaw rate sensor 34 and the target yaw rate $YR_{NOM}$ (ΔYR=$YR_{NOM}$-YR). The yaw rate deviation ΔYR indicates a "slip" from a neutral steering state of the vehicle body CR. When an absolute value |ΔYR| of the yaw rate deviation ΔYR is a predetermined value or more, the vehicle state is judged to be unstable and the vehicle behavior judgment part 122 outputs signals to the turning state judgment part 123 and the target fluid pressure calculation part 124. It should be noted that the target yaw rate corresponds to "target amount of turning" and the actual yaw rate corresponds to "actual amount of turning".

Figure 8:
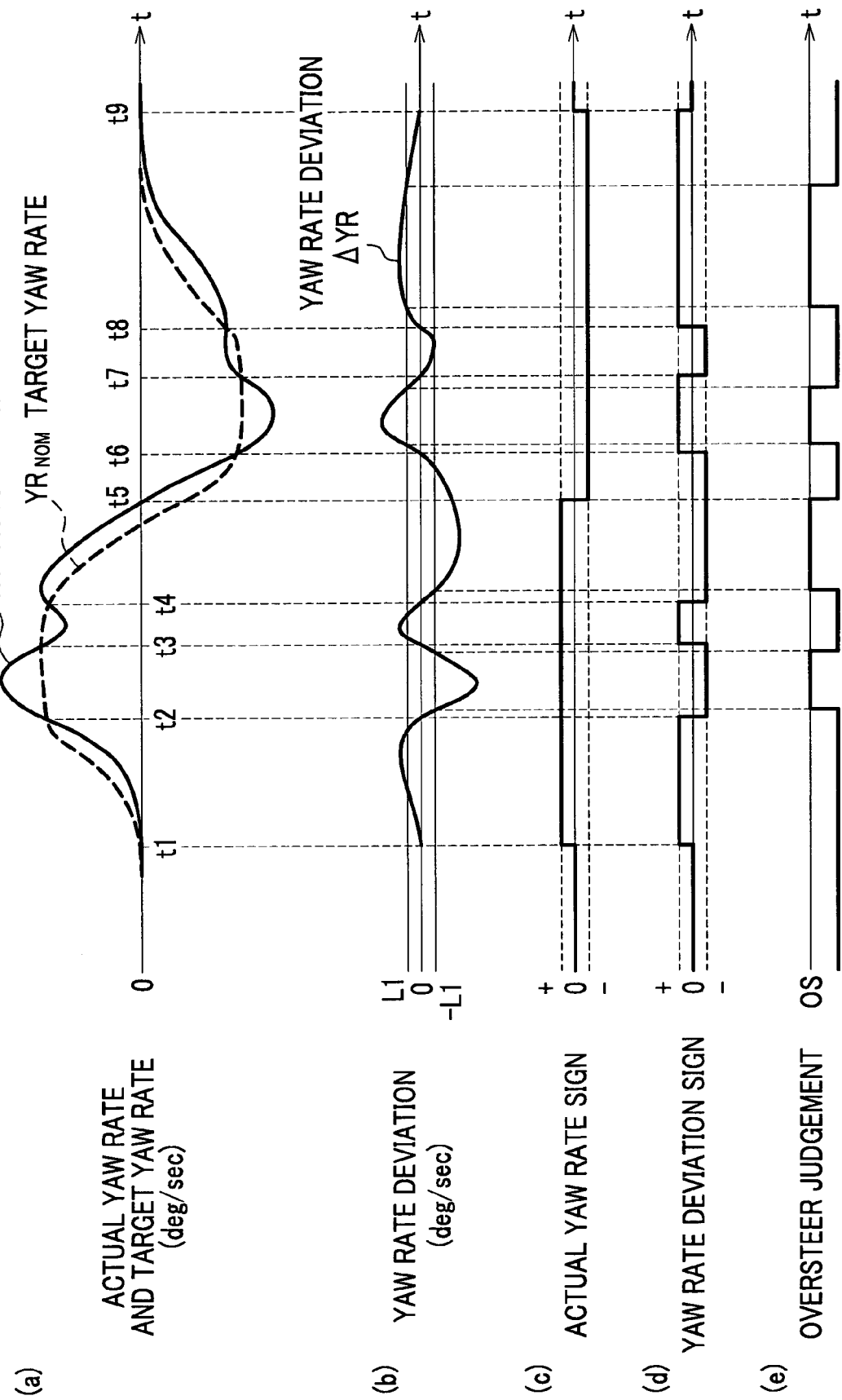
FIG. 8 shows time charts for judging whether a vehicle body is in an oversteer state when turning: (a) is a time chart for an actual yaw rate and a target yaw rate, (b) is a time chart for a yaw rate deviation, (c) is a time chart for an actual yaw rate sign, (d) is a time chart for a yaw rate deviation sign, and (e) is a time chart for a result of judgment regarding oversteer.

The turning state judgment part 123 judges whether a turning state of the vehicle is oversteer or understeer based on the yaw rate deviation ΔYR calculated by the turning amount deviation calculation part 122B, which is, in this embodiment, provided with an oversteer judgment part 123A. The oversteer judgment part 123A judges whether a turning state of the vehicle body CR is oversteer or not, based on the magnitude of the yaw rate deviation ΔYR and on whether an absolute value |YR| of the actual yaw rate YR is larger than an absolute value $|YR_{NOM}|$ of the target yaw rate $YR_{NOM}$ ($|YR|>|YR_{NOM}|$) or not. A method for judging whether the vehicle body CR is in an oversteer state or not will be explained below with reference to FIG. 8. FIG. 8 shows time charts for judging whether a vehicle body is in an oversteer state when turning: (a) is a time chart for an actual yaw rate and a target yaw rate, (b) is a time chart for a yaw rate deviation, (c) is a time chart for an actual yaw rate sign, (d) is a time chart for a yaw rate deviation sign, and (e) is a time chart for a result of judgment regarding oversteer.

First, a yaw rate deviation ΔYR, a sign of an actual yaw rate YR and a sign of the yaw rate deviation ΔYR are obtained as necessary information.

As shown in FIG. 8(a), when the vehicle body CR begins to turn in response to steering by a driver, a target yaw rate $YR_{NOM}$ produces a wave pattern that corresponds to the steering. When a wheel T, either a front wheel or a rear wheel, is not sideslipping, the actual yaw rate matches with the target yaw rate $YR_{NOM}$, but for example, when the front wheel is sideslipping, the absolute value of the actual yaw rate YR becomes smaller than the absolute value of the target yaw rate $YR_{NOM}$ (for example, $|YR|<|YR_{NOM}|$ in periods of t1-t2, t3-t4, t5-t6 and t7-t8), and when the rear wheel is sideslipping, the absolute value of the actual yaw rate YR becomes larger than the absolute value of the target yaw rate $YR_{NOM}$ (for example, $|YR|>|YR_{NOM}|$ in periods of t2-t3, t4-t5, t6-t7 and t8-t9).

FIG. 8(b) shows the above-mentioned states in terms of the yaw rate deviation ΔYR calculated by the turning amount deviation calculation part 122B. With respect to the yaw rate deviation ΔYR, a predetermined value L1 is set for judging whether the vehicle body CR is in an oversteer state. A change in the sign of the actual yaw rate YR shown in FIG. 8(c) indicates that the actual turning direction of the vehicle body CR has changed. On the other hand, the sign of the yaw rate deviation shown in FIG. 8(d) changes every time the magnitude relationship between the target yaw rate $YR_{NOM}$ and the actual yaw rate YR switches, i.e., every time the magnitude relationship between the sideslip rate of the front wheels and the sideslip rate of the rear wheels switches.

As shown in FIG. 8(e), when the actual yaw rate sign (FIG. 8(c)) and the yaw rate deviation sign (FIG. 8(d)) are opposite, and the absolute value of the yaw rate deviation ΔYR is an absolute value of a predetermined value L1 or more (|ΔYR|≧|L1|), the state is judged to be oversteer. To sum up, when the absolute value of the actual yaw rate YR is larger than the target yaw rate $YR_{NOM}$ ($|YR|>|YR_{NOM}|$, see FIG. 8(a)), and the absolute value of the yaw rate deviation ΔYR is an absolute value of the predetermined value L1 or more (|ΔYR|≧|L1|), the state is judged to be oversteer.

As shown in FIG. 7, the target fluid pressure calculation part 124 calculates a target fluid pressure $P_T$ for each of the wheel brakes FL, RL, FR, RR based on the yaw rate deviation ΔYR calculated by the vehicle behavior judgment part 122 and the like. There is no limitation with respect to the calculation method and conventional methods can be used. When an absolute value of the actual yaw rate YR is larger than an absolute value of the target yaw rate $YR_{NOM}$ ($|YR|>|YR_{NOM}|$), a predetermined brake fluid pressure is supplied to the front outer wheel so as to reduce the actual yaw rate YR. On the contrary, when the absolute value of the actual yaw rate YR is smaller than the absolute value of the target yaw rate $YR_{NOM}$ ($|YR|<|YR_{NOM}|$), a predetermined brake fluid pressure is supplied to the rear inner wheel so as to increase the actual yaw rate YR.

The brake fluid pressure estimate part 125 estimates a brake fluid pressure Pw at the wheel cylinder H, based on the master cylinder pressure $P_M$ detected by the master pressure sensor 8. There is no limitation with respect to the estimation method and conventional methods can be used. One example includes acquiring periods for driving the inlet valve 1, the outlet valve 2, the cut valve 6 and the suction valve 7 in the fluid pressure unit 10; detecting the number of revolutions of the motor 9; calculating periods for opening the inlet valve 1 and the outlet valve 2; calculating an increased amount in the brake fluid pressure due to the driving of the motor 9; and finally estimating a brake fluid pressure Pw for each of the wheels T based on the period for opening, the increased amount and the master cylinder pressure $P_M$. Alternatively, the brake fluid pressure PW at the wheel cylinder H may be detected by a pressure sensor.

The fluid pressure deviation calculation part 126 calculates a fluid pressure deviation ΔP from the target fluid pressure $P_T$ output from the target fluid pressure calculation part 124 and the brake fluid pressure $P_W$ for each of the wheels T output from the brake fluid pressure estimate part 125. The fluid pressure deviation calculation part 126 calculates fluid pressure deviations ΔP for all of the four wheels T, and outputs a fluid pressure deviation $\Delta P_{MAX}$, which is the maximum value among the fluid pressure deviations ΔP, to the motor revolution number determining part 127.

The motor revolution number determining part 127 determines a revolution number of the pump 4 based on the signal input from the turning state judgment part 123 and the fluid pressure deviation $\Delta P_{MAX}$ input from the fluid pressure deviation calculation part 126. The number of revolutions of the pump 4 can be appropriately selected among 0 revolution, low revolutions and high revolutions.

Figure 9:
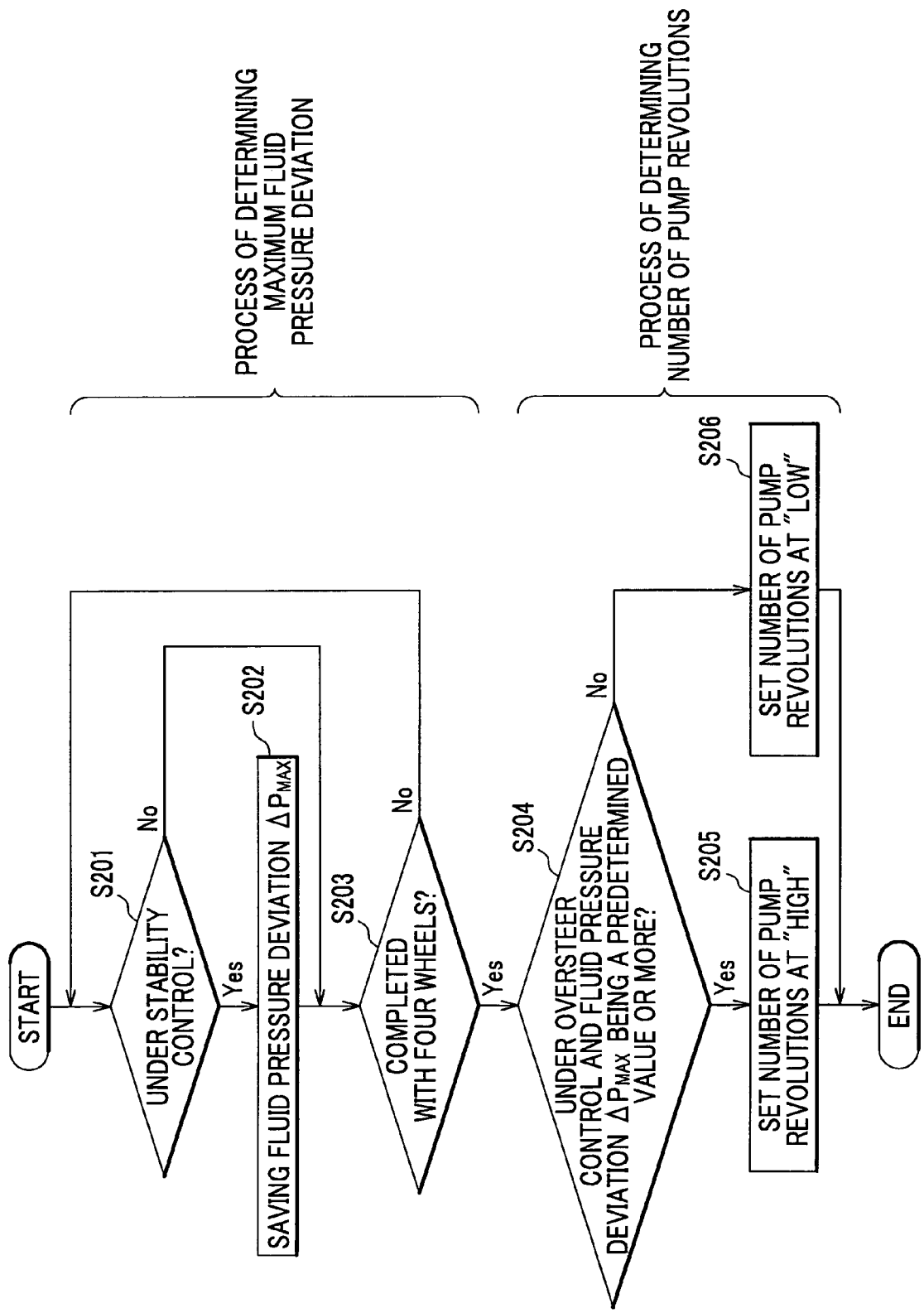
FIG. 9 is a flow chart showing control of a fluid pressure deviation calculation part and a motor revolution number determining part.
Figure 10:
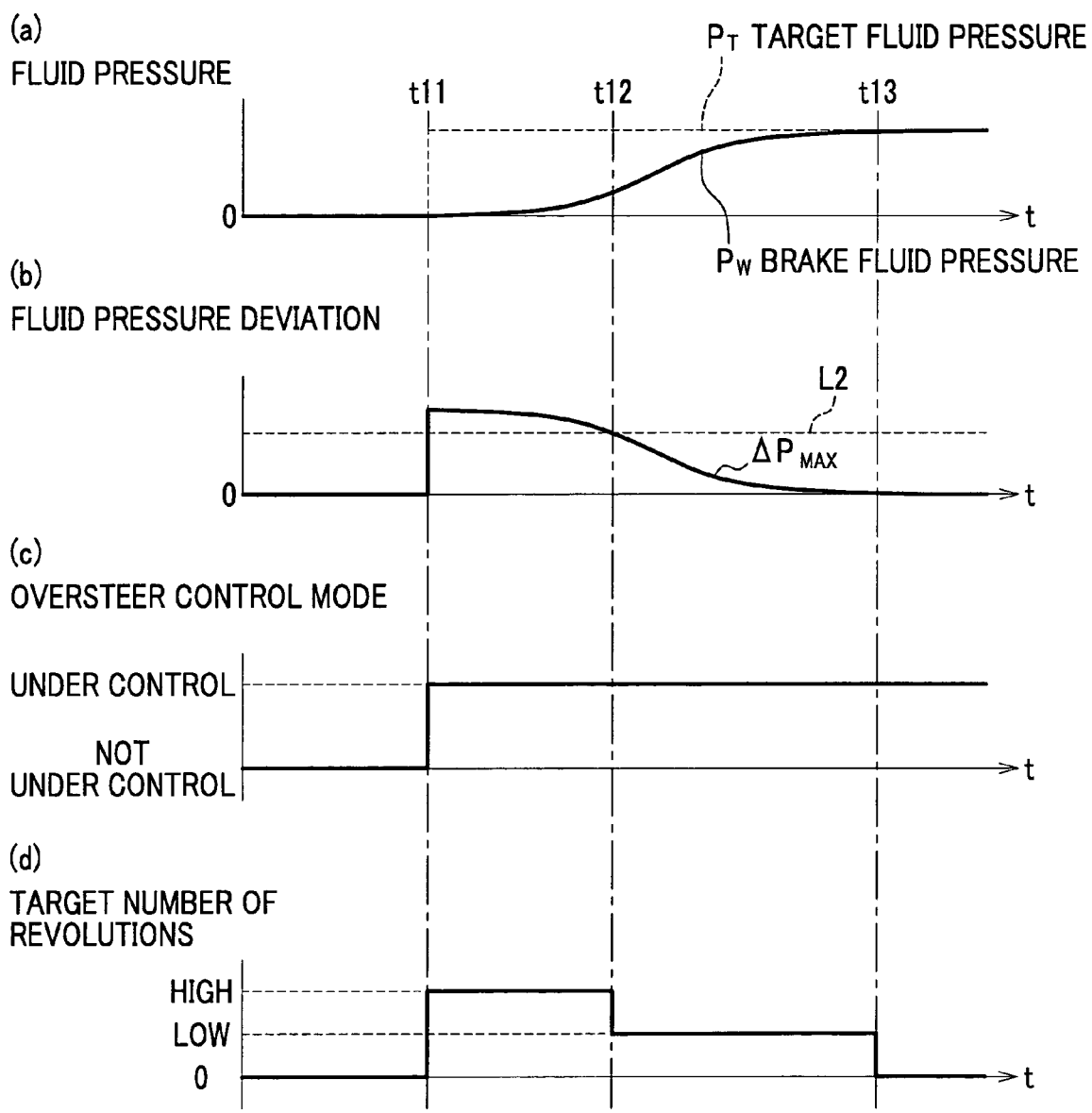
FIG. 10 shows time charts for determining a target number of revolutions in a case of oversteer; (a) is a time chart for a target fluid pressure and an estimated brake fluid pressure, (b) is a time chart for a fluid pressure deviation, (c) is a time chart for judgment regarding oversteer, and (d) is a time chart for a target number of revolutions.
Figure 11:
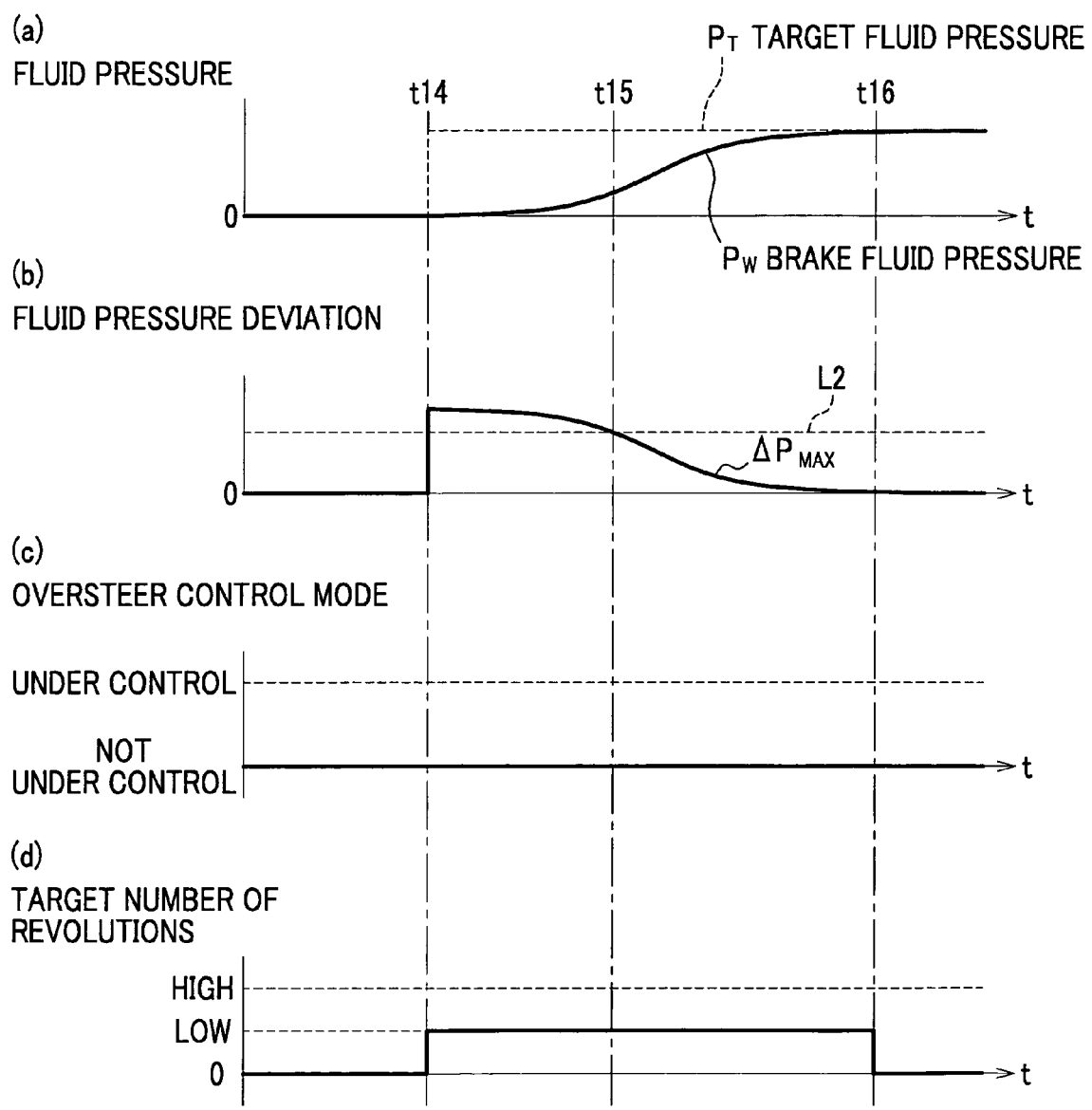
FIG. 11 shows time charts for determining a target number of revolutions in a case of non-oversteer; (a) is a time chart for a target fluid pressure and an estimated brake fluid pressure, (b) is a time chart for a fluid pressure deviation, (c) is a time chart for judgment regarding oversteer, and (d) is a time chart for a target number of revolutions.

Referring to FIGS. 9, 10 and 11, a control flow of the fluid pressure deviation calculation part 126 and the motor revolution number determining part 127 is explained. In the drawings to be referred to, FIG. 9 is a flow chart showing control of the fluid pressure deviation calculation part and the motor revolution number determining part. FIG. 10 shows time charts for determining a target number of revolutions in a case of oversteer; (a) is a time chart for a target fluid pressure and an estimated brake fluid pressure, (b) is a time chart for a fluid pressure deviation, (c) is a time chart for judgment regarding oversteer, and (d) is a time chart for a target number of revolutions. FIG. 11 shows time charts for determining a target number of revolutions in a case of non-oversteer; (a) is a time chart for a target fluid pressure and an estimated brake fluid pressure, (b) is a time chart for a fluid pressure deviation, (c) is a time chart for judgment regarding oversteer, and (d) is a time chart for a target number of revolutions.

First, in the fluid pressure deviation calculation part 126 (see FIG. 7), the wheel T to be controlled is judged to be under vehicle behavior control or not, i.e., the amount of the brake fluid pressure of the wheel T is judged to be under control or not (step S201), as shown in FIG. 9. When the wheel T of interest is judged to be under vehicle behavior control (Yes in the step S201), a fluid pressure deviation ΔP ($\Delta P_{MAX}$) is saved to (recorded in) a memory part, such as RAM (not shown) (step S202). At a next step, it is judged whether this process is completed for all of the four wheels T (step S203). If not (No in the step S203), the process returns to the step S201 and the same procedure is repeated. In the step S202, when a fluid pressure deviation ΔP calculated this time is smaller than the previously calculated value, the previously calculated value is saved in situ as the maximum fluid pressure deviation $\Delta P_{MAX}$, and when the fluid pressure deviation ΔP is larger than the previously calculated value, the value calculated in this process is saved as the maximum fluid pressure deviation $\Delta P_{MAX}$. When the wheel T of interest is not under vehicle behavior control (No in the step S201), the process proceeds to the step S203 and the same procedure is repeated.

When the process is judged to be completed with the four wheels (Yes in the step S203), it is judged whether over steer or not (under oversteer control or not), as well as whether the fluid pressure deviation $\Delta P_{MAX}$ is the predetermined value or more or not (step S204) In the case of 'Yes' in the step S204, the number of pump revolutions is set to 'high' (step S205), and then the process is terminated. On the other hand, in the case of 'No' in the step S204, the number of pump revolutions is set to 'low' (step S206), and then the process is terminated.

To sum up, as shown in FIG. 10(a), when the difference between the target fluid pressure $P_T$ and the brake fluid pressure $P_W$ becomes large and the fluid pressure deviation ΔP (FIG. 10(b)) becomes a predetermined value L2 or more (t11-t12), and at the same time, the vehicle is under oversteer control (FIG. 10(c)) (judged as oversteer by the oversteer judgment part 123A), the target number of revolutions (FIG. 10(d)) is set to 'high', as the rapid elevation of the pressure is required. On the contrary, when the fluid pressure deviation ΔP (FIG. 10(b)) is less than the predetermined value (after t12), even though the vehicle is under oversteer control (FIG. 10(c)), the target number of revolutions (FIG. 10(d)) is set to 'low', as the rapid elevation of the pressure is not urgently required. When the fluid pressure deviation ΔP is '0' (before t11 or after t13), the target number of revolutions is set to '0'. It should be noted that, even when fluid pressure deviation ΔP is not exact '0', the target number of revolutions may be set to '0'. For example, the target number of revolutions can be set to '0' when the fluid pressure deviation ΔP falls in a certain range, such as a predetermined value or less.

On the contrary, as shown in FIG. 11, when the oversteer control is not performed (FIG. 11(c)), the target number of revolutions (FIG. 11(d)) is set to 'low' regardless of the fluid pressure deviation ΔP (FIG. 11(b)). In the case where the fluid pressure deviation ΔP is '0' (before t14 or after t16), the target number of revolutions is set to '0', like in the case where the oversteer control is performed.

As shown in FIG. 7, the motor drive part 128 outputs a pulse signal to the motor 9 of the fluid pressure unit 10 to operate the pump 4 by conventional methods so that the number of revolutions of the motor 9 or the pump 4 (see FIG. 2) matches the number of revolutions determined by the motor revolution number determining part 127. Specifically, when the pump 4 is determined to be operated at 'high revolutions', the output is set by PWM control so that the duty ratio becomes, for example, 100%. On the other hand, when the pump 4 is determined to be operated at 'low revolutions', the output is set so that the duty ratio becomes, for example, 50%. With these settings, the number of revolutions (power) of the motor 9 (see FIG. 2) in the fluid pressure unit 10 is changed in accordance with the duty ratio, and the number of revolutions (power) of the pump 4 is also changed. It should be noted that the duty ratio is arbitrarily selected.

The valve drive part 129 outputs a pulse signal to the fluid pressure unit 10 to operate the inlet valve 1, the outlet valve 2, the cut valve 6 and the suction valve 7 in the fluid pressure unit 10 by conventional methods so that the brake fluid pressure $P_W$ of the wheel cylinder H of each of the wheel brakes FL, FR, RL, RR matches the target fluid pressure $P_T$ calculated by the target fluid pressure calculation part 124. For example, the pulse signal is more frequently output when the fluid pressure deviation ΔP, which is the difference between the brake fluid pressure $P_W$ and the target fluid pressure $P_T$, of the wheel cylinder H at present is larger. It should be noted that the brake fluid pressure of the wheel cylinder H at present may be measured by a sensor, or may be estimated by calculation.

According to the above-described brake fluid pressure controller 100, the following effects can be obtained.

By subjecting the pump 4 to drive control under different powers (number of revolutions) depending on the result of the judgment by the turning state judgment part, the drive state of the pump 4 is improved, and thus noise can be reduced. Specifically, when the vehicle body CR is in an oversteer state and at the same time the fluid pressure deviation $ΔP_{MAX}$ is a predetermined value L2 or more, the number of revolutions of the pump 4 is set at high (under high power), and therefore, it becomes possible to adequately respond to the requirement of rapid pressure elevation. On the other hand, when the vehicle body CR is not judged to be in an oversteer state of turning movement, the pump 4 is subjected to drive control under lower power than a case in which the vehicle body CR is judged to be in an oversteer state. In other words, the oversteer state is a state in which the vehicle body CR turns to a rudder angle or more, and a rapid pressure elevation is required in order to prepare for operation of vehicle stability control. On the contrary, when the vehicle body CR is in a state other than the oversteer state, the requirement of the pressure elevation is not so high, and the pump 4 can be driven under lower power. Therefore, noise can be reduced.

In addition, a state of turning movement is judged based on the magnitude of the difference between the actual amount of turning and the target amount of turning and on whether the absolute value of the actual amount of turning exceeds the absolute value of the target amount of turning. Specifically, the vehicle body CR is judged to be in an oversteer state when the difference meets the predetermined conditions and at the same time the absolute value of the actual amount of turning exceeds the absolute value of the target amount of turning. Therefore, the oversteer state can be accurately judged.

Moreover, when the vehicle body CR is not judged to be in an oversteer state by the oversteer state judgment part, or when the maximum value among the differences calculated by the fluid pressure deviation calculation part 126 is lower than the predetermined value, the pump 4 is subjected to drive control under lower power than a case where the vehicle body CR is in an oversteer state and at the same time the maximum value is larger than the predetermined value. With these settings, even when the vehicle body CR is in an oversteer state, operation of the pump 4 is suppressed depending on the height of the required pressure elevation, and therefore noise can be reduced.

The second embodiment of the present invention has been described above. However, the present invention should not be limited to the above embodiment, and it is a matter of course that the above embodiment may properly be modified without departing from the scope of the present invention. For example, in the above embodiment, the pump 4 is set to be driven under low power in the cases other than the case where "the vehicle body CR is in an oversteer state and the fluid pressure deviation $ΔP_{MAX}$ is a predetermined value L2 or more". However, the present invention is not limited to this embodiment, and the pump 4 is set to be driven under high power, only in the case where "the vehicle body CR is in an oversteer state", and in the case other than the above case, the pump 4 is set to be driven under low power.

What is claimed is:

1. A brake fluid pressure controller for a vehicle for controlling brake fluid pressures of a plurality of wheel brakes to respective target fluid pressures comprising:
    the plurality of wheel brakes;
    a fluid pressure-supply part configured to supply pressure to a brake fluid;
    at least one fluid pressure passage connecting the plurality of wheel brakes with the fluid pressure-supply part;
    a pump which is provided on each fluid pressure passage and capable of intensifying the brake fluid pressure;
    a revolution-controllable motor configured to drive the pump;
    a motor drive control part configured to control a revolution number of the motor; which further comprises:
    a target fluid pressure calculation part configured to set a target fluid pressure of the brake fluid for each of the wheels;
    a brake fluid pressure acquisition part configured to acquire a brake fluid pressure for each of the wheels; and
    a fluid pressure deviation calculation part configured to calculate a difference between the target fluid pressure set by the target fluid pressure calculation part and the brake fluid pressure acquired by the brake fluid pressure acquisition part;
    the motor drive control part driving the motor at a smaller number of revolutions in a case where a difference at the wheel brake between the target fluid pressure and the brake fluid pressure is less than a predetermined value, as compared with a case where the difference between the target fluid pressure and the brake fluid pressure is the predetermined value or more.

2. The brake fluid pressure controller according to claim 1, wherein
    each of the fluid pressure passages is provided with a linear solenoid valve;
    the pump is capable of intensifying the brake fluid pressure in each of the fluid pressure passages on a wheel brake side relative to the solenoid valve;
    the motor drive control part driving the motor at a maximum number of revolutions in a case where the target fluid pressure of at least one wheel brake is larger than the brake fluid pressure and the difference between the pressures is a predetermined value or more, and
    the motor drive control part driving the motor at a smaller number of revolutions than the maximum number of revolutions in a case where the target fluid pressure of at least one wheel brake is larger than the brake fluid pressure and the difference between the pressures at all of the wheel brakes is less than the predetermined value.

3. The brake fluid pressure controller according to claim 1, wherein the motor drive control part drives the motor so as to make the brake fluid pressure approach the target fluid pressure at one of the wheel brakes, in a case where the motor is driven at the smaller number of revolutions.

4. The brake fluid pressure controller according to claim 2, wherein the motor drive control part drives the motor so as to make the brake fluid pressure approach the target fluid pressure at one of the wheel brakes, in a case where the motor is driven at the smaller number of revolutions.

5. The brake fluid pressure controller according to claim 1, wherein the brake fluid pressure acquisition part acquires an estimated brake fluid pressure for each of the wheel brakes.

6. The brake fluid pressure controller according to claim 2, wherein the brake fluid pressure acquisition part acquires an estimated brake fluid pressure for each of the wheel brakes.

7. The brake fluid pressure controller according to claim 1, wherein the motor drive control part controls a revolution number of the motor by duty control.

8. The brake fluid pressure controller according to claim 2, wherein the motor drive control part controls a revolution number of the motor by duty control.

9. A brake fluid pressure controller for a vehicle configured to control a supply of a brake fluid pressure to fluid pressure type brake of each wheel so as to stabilize a behavior of the vehicle, which comprises:
a plurality of wheel brakes;
a fluid pressure-supply part configured to supply pressure to a brake fluid;
at least one fluid pressure passage connecting the plurality of wheel brakes with the fluid pressure-supply part;
a pump which is provided on each fluid pressure passage and capable of intensifying the brake fluid pressure;
a revolution-controllable motor configured to drive the pump;
a behavior judgment part configured to judge whether behavior of the turning vehicle corresponds to an unstable state;
a motor drive control part configured to control a drive of the motor when the behavior judgment part judged that the behavior corresponds to the unstable state;
further comprising:
a turning state judgment part configured to judge a state of turning movement of the vehicle,
wherein
the motor drive control part controls a drive of the pump under different powers based on a result of the judgment by the turning state judgment part.

10. The brake fluid pressure controller according to claim 9, wherein
the turning state judgment part has an oversteer state judgment part configured to judge an oversteer state of turning movement of the vehicle,
the motor drive control part controls the drive of the pump under lower power in a case where the vehicle is not judged to be in an oversteer state by the oversteer state judgment part, as compared with a case where the vehicle is judged to be in an oversteer state.

11. The brake fluid pressure controller according to claim 9, which further comprises:
an actual turning amount detection part configured to detect an actual amount of turning of the vehicle;
a target turning amount calculation part configured to calculate a target amount of turning of the vehicle; and
a turning amount deviation calculation part configured to calculate a difference between the detected actual amount of turning and the calculated target amount of turning;
wherein
the turning state judgment part judges a state of turning movement based on a magnitude of the calculated difference and on whether an absolute value of the actual amount of turning exceeds an absolute value of the target amount of turning.

12. The brake fluid pressure controller according to claim 10, which further comprises:
an actual turning amount detection part configured to detect an actual amount of turning of the vehicle;
a target turning amount calculation part configured to calculate a target amount of turning of the vehicle; and
a turning amount deviation calculation part configured to calculate a difference between the detected actual amount of turning and the calculated target amount of turning;
wherein
the turning state judgment part judges a state of turning movement based on a magnitude of the calculated difference and on whether an absolute value of the actual amount of turning exceeds an absolute value of the target amount of turning.

13. The brake fluid pressure controller according to claim 10, which further comprises:
a target fluid pressure calculation part configured to set a target fluid pressure of the brake fluid for each of the wheels;
a brake fluid pressure acquisition part configured to acquire a brake fluid pressure for each of the wheels; and
a fluid pressure deviation calculation part configured to calculate a difference between the target fluid pressure set by the target fluid pressure calculation part and the brake fluid pressure acquired by the brake fluid pressure acquisition part;
wherein
the motor drive control part drives the motor under lower power in a case where the vehicle is not judged to be in an oversteer state by the oversteer state judgment part or in a case where the difference calculated by the fluid pressure deviation calculation part is less than a predetermined value, as compared with a case where the vehicle is judged to be in an oversteer state and the difference calculated by the fluid pressure deviation calculation part is the predetermined value or more.

14. The brake fluid pressure controller according to claim 10, which further comprises
a target fluid pressure calculation part configured to set a target fluid pressure of the brake fluid for each of the wheels;
a brake fluid pressure acquisition part configured to acquire a brake fluid pressure for each of the wheels; and
a fluid pressure deviation calculation part configured to calculate a difference between the target fluid pressure set by the target fluid pressure calculation part and the brake fluid pressure acquired by the brake fluid pressure acquisition part;
wherein the motor drive control part controls a drive of the motor under lower power in a case where the vehicle is not judged to be in an oversteer state by the oversteer state judgment part or in a case where the maximum value of the differences calculated by the fluid pressure deviation calculation part is smaller than a predetermined value, as compared with a case where the vehicle is judged to be in an oversteer state and the maximum value is the predetermined value or more.

* * * * *